United States Patent
Cabral Melo et al.

(10) Patent No.: US 9,890,492 B2
(45) Date of Patent: Feb. 13, 2018

(54) METHOD OF DETERMINING INERTIA IN A LAUNDRY TREATING APPLIANCE

(71) Applicant: Whirlpool Corporation, Benton Harbor, MI (US)

(72) Inventors: Rafael Cabral Melo, Joinville (BR); Fernando Elias De Oliveira, Joinville (BR); Bradley D. Morrow, Stevensville, MI (US); Maurilio Fabio Rodriques Catharino, Joinville (BR); Yingqin Yuan, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 402 days.

(21) Appl. No.: 14/666,773

(22) Filed: Mar. 24, 2015

(65) Prior Publication Data

US 2016/0281288 A1    Sep. 29, 2016

(51) Int. Cl.
| | |
|---|---|
| *D06F 37/30* | (2006.01) |
| *G05B 19/04* | (2006.01) |
| *D06F 37/36* | (2006.01) |
| *D06F 33/02* | (2006.01) |
| *D06F 35/00* | (2006.01) |
| *G05B 19/042* | (2006.01) |

(52) U.S. Cl.
CPC ............ *D06F 37/304* (2013.01); *D06F 33/02* (2013.01); *D06F 35/007* (2013.01); *D06F 37/36* (2013.01); *D06F 2202/065* (2013.01); *D06F 2202/12* (2013.01); *D06F 2204/065* (2013.01); *D06F 2212/02* (2013.01); *G05B 19/0426* (2013.01); *G05B 2219/2633* (2013.01)

(58) Field of Classification Search
CPC ................ D06F 37/203; D06F 39/003; D06F 2202/065; D06F 2202/12; D06F 2204/065; D06F 33/02; D06F 35/007; D06F 2220/00; D06F 35/006; G05B 2219/2633; G05B 19/04; G05B 19/0426
USPC ........................................................ 700/275
See application file for complete search history.

(56) References Cited

U.S. PATENT DOCUMENTS

| | | | |
|---|---|---|---|
| 5,507,054 A | 4/1996 | Blauert et al. | |
| 5,671,493 A * | 9/1997 | Moon | ................... D06F 39/003 68/12.04 |
| 6,505,369 B1 | 1/2003 | Weinmann | |
| 7,162,759 B2 | 1/2007 | Weinmann | |
| 7,739,764 B2 | 6/2010 | Zhang et al. | |
| 7,958,585 B2 | 6/2011 | Zhang et al. | |
| 8,914,930 B2 * | 12/2014 | Chanda | ................... D06F 33/02 68/12.04 |

(Continued)

FOREIGN PATENT DOCUMENTS

| | | |
|---|---|---|
| DE | 4038178 C2 | 6/1992 |
| DE | 4431846 C2 | 3/1996 |

*Primary Examiner* — Chun Cao (57) ABSTRACT

An embodiment of a method of determining inertia of a laundry load may comprise an extraction stabilization phase, where liquid is extracted from the laundry load by rotating the basket at first rotational speed, and a sensing phase. The sensing phase may include a deceleration phase, where the basket speed decreases to a second rotational speed, followed by an acceleration phase, where the basket speed increases back toward the first rotational speed. The inertia of the laundry load may be determined from data sensed during the deceleration and acceleration phases.

18 Claims, 7 Drawing Sheets

(56) References Cited

U.S. PATENT DOCUMENTS

| | | | | |
|---|---|---|---|---|
| 9,080,277 B2* | 7/2015 | Erickson | ............... | D06F 37/203 |
| 2004/0194226 A1 | 10/2004 | Kim et al. | | |
| 2006/0242768 A1* | 11/2006 | Zhang | ................... | D06F 37/203 |
| | | | | 8/159 |
| 2007/0193310 A1* | 8/2007 | Penteado | .............. | D06F 39/003 |
| | | | | 68/12.04 |
| 2009/0199598 A1* | 8/2009 | Kanazawa | .............. | D06F 33/02 |
| | | | | 68/12.04 |
| 2013/0160220 A1* | 6/2013 | Ashrafzadeh | ........... | D06F 33/02 |
| | | | | 8/137 |
| 2013/0160221 A1* | 6/2013 | Ashrafzadeh | ........... | D06F 33/02 |
| | | | | 8/137 |

* cited by examiner

FIG. 7

METHOD OF DETERMINING INERTIA IN A LAUNDRY TREATING APPLIANCE

BACKGROUND

Laundry treating appliances, such as a washing machine, may include a basket defining a treating chamber for receiving and treating a laundry load according to a cycle of operation. The appliance may include a device, such as a load cell, or implement a method to determine an inertia of the laundry load. The inertia can be very useful information for algorithms run by the appliance during the cycle of operation. As an example, the cycle of operation may include one or more steps during which liquid may be removed from the laundry load, an example of which is a spin extraction step where a basket holding the laundry rotates at speeds high enough to impart a sufficient centrifugal force on the laundry load to remove the liquid. The inertia may be used, for example, to determine when to end the spin extraction step or a maximum spin speed of the basket for the spin extraction step.

BRIEF SUMMARY

A method according to one embodiment of determining the inertia of a laundry load in a laundry treating appliance comprising a tub, a basket located within the tub and defining a treating chamber for the laundry load, and a motor operably coupled to the basket for rotating the basket may comprise an extraction stabilization phase where liquid is extracted from the laundry load by rotating the basket at a first rotational speed and a sensing phase comprising a deceleration phase, where the rotational speed of the basket is decelerated from the first rotational speed to a second rotational speed, followed by an acceleration phase, where the rotational speed of the basket is accelerated from the second rotational speed back toward the first rotational speed, wherein motor torque data and basket acceleration rate data are sensed during the acceleration and deceleration phases. The inertia of the laundry load is determined from the motor torque data and the basket acceleration rate data.

DETAILED DESCRIPTION

Figure 1:
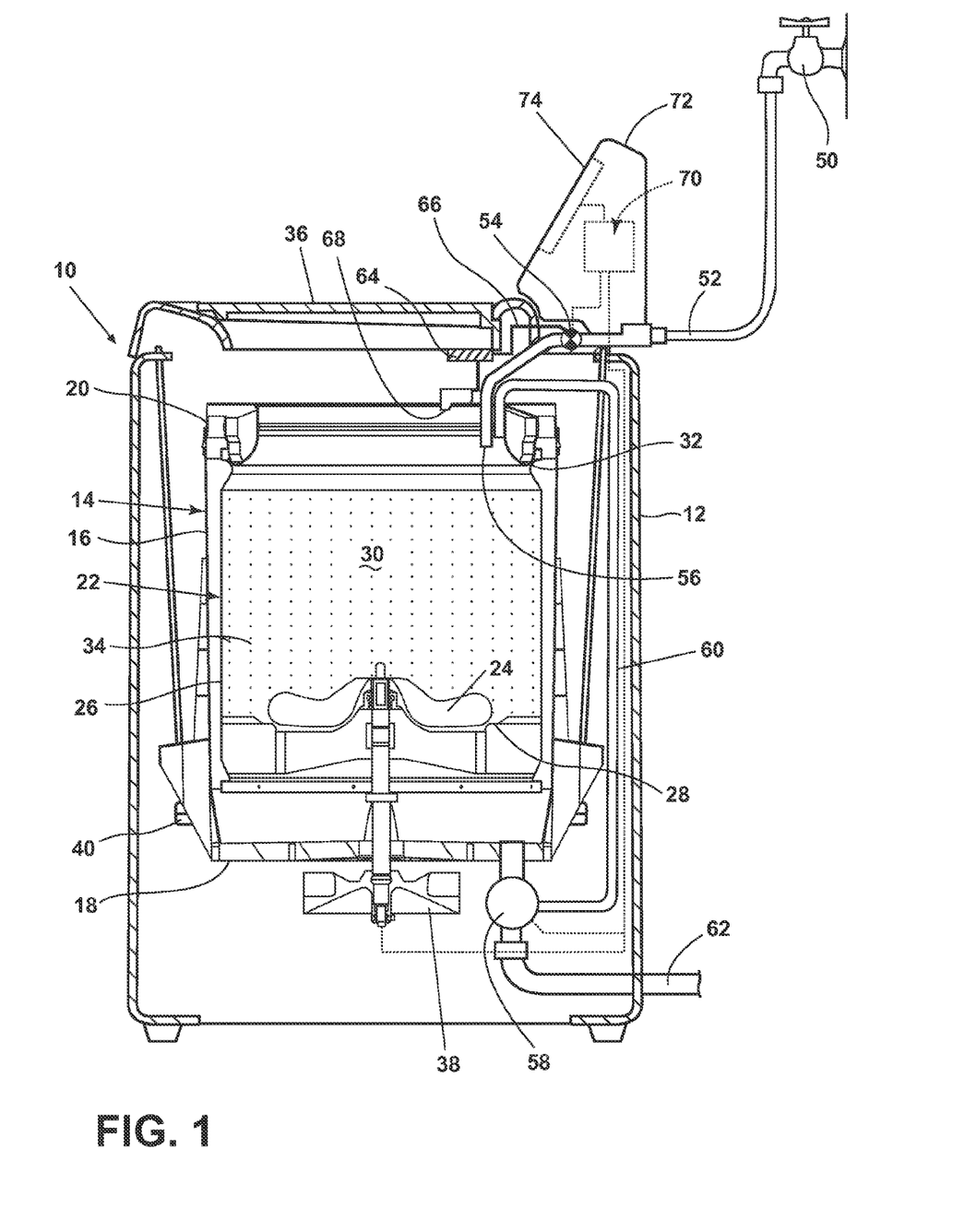
FIG. 1 is a schematic sectional view of a laundry treating appliance in the form of a washing machine.

FIG. 1 is a schematic view of a laundry treating appliance according to an exemplary embodiment. The laundry treating appliance may be any appliance that performs a cycle of operation to clean or otherwise treat items placed therein, non-limiting examples of which include a horizontal or vertical axis clothes washing machine, a combination washing machine and dryer, a tumbling or stationary refreshing/revitalizing machine, an extractor, a non-aqueous washing apparatus, and a revitalizing machine.

Washing machines are typically categorized as either a vertical axis washing machine or a horizontal axis washing machine. As used herein, the "vertical axis" washing machine refers to a washing machine having a rotatable drum/basket (used interchangeably herein), perforate or imperforate, that holds fabric items and a laundry mover, such as an agitator, impeller, nutator, and the like within the drum. The clothes mover moves within the drum to impart mechanical energy directly to the clothes or indirectly through liquid in the drum. The clothes mover may typically be moved in a reciprocating rotational movement. In some vertical axis washing machines, the drum rotates about a vertical axis generally perpendicular to a surface that supports the washing machine. However, the rotational axis need not be vertical. The drum may rotate about an axis inclined relative to the vertical axis. As used herein, the "horizontal axis" washing machine refers to a washing machine having a rotatable drum/basket, perforated or imperforated, that holds fabric items and washes the fabric items by rubbing against one another as the drum rotates. In some horizontal axis washing machines, the drum rotates about a horizontal axis generally parallel to a surface that supports the washing machine. However, the rotational axis need not be horizontal. The drum may rotate about an axis inclined relative to the horizontal axis. In horizontal axis washing machines, the clothes are lifted by the rotating drum and then fall in response to gravity to form a tumbling action. Mechanical energy is imparted to the clothes by the tumbling action formed by the repeated lifting and dropping of the clothes. Vertical axis and horizontal axis machines are best differentiated by the manner in which they impart mechanical energy to the fabric items. The illustrated exemplary washing machine of FIG. 1 is a vertical axis washing machine.

The laundry treating appliance of FIG. 1 is illustrated as a vertical axis washing machine 10, which may include a structural support system comprising a cabinet 12 that defines a housing within which a laundry holding system resides. The cabinet 12 may be a housing having a chassis and/or a frame, defining an interior receiving components typically found in a conventional washing machine, such as motors, pumps, fluid lines, controls, sensors, transducers, and the like. Such components will not be described further herein except as necessary for a complete understanding of the invention.

The laundry holding system of the illustrated exemplary washing machine 10 may include a watertight tub 14 installed in the cabinet 12. The tub 14 may have a generally cylindrical side or peripheral wall 16 closed at its bottom end by a base 18 that may at least partially define a sump and open at an upper end 20 to define an opening to an interior of the tub 14 for holding liquid. A perforated basket 22 may be mounted in the tub 14 for rotation about an axis of rotation, such as, for example, a central, vertical axis extending through the center of a laundry mover 24 in the form of an impeller, as an example, located within the basket 22. Other exemplary types of laundry movers include, but are not limited to, an agitator, a wobble plate, and a hybrid impeller/agitator. The basket 22 may have a generally cylindrical side or peripheral wall 26 closed at its bottom end by a base 28 to form an interior at least partially defining a laundry treating chamber 30 receiving a load of laundry items for treatment and open at an upper end 32 to provide access to the treating chamber 30. The peripheral wall 26 may include a plurality of perforations or apertures 34 such that liquid supplied to the basket 22 may flow through the perforations 34 to the tub 14. The top of the cabinet 12 may include a selectively openable lid 36 to provide access into the laundry treating chamber 30 through an open top of the basket 22.

A drive system including a drive motor 38, which may or may not include a gear case, may be utilized to rotate the basket 22 and the laundry mover 24. The motor 38 may rotate the basket 22 in either rotational direction and at various speeds, including at a spin speed wherein a centrifugal force at the inner surface of the basket peripheral wall 26 is 1 g or greater. The centrifugal force at a spin speed distributes the laundry about a periphery of the basket, and spin speeds are commonly known for use in extracting liquid from the laundry items in the basket 22, such as after a wash or rinse step in a treating cycle of operation. The motor 38 may also oscillate or rotate the laundry mover 24 about its axis of rotation during a cycle of operation in order to provide movement to the load contained within the laundry treating chamber 30. The motor 38 may be a brushless permanent magnet (BPM) motor. Other motors, such as an induction motor or a permanent split capacitor (PSC) motor, may also be used. The illustrated drive system for the basket 22 and the laundry mover 24 is provided for exemplary purposes only and is not limited to that shown in the drawings and described above; the particular drive system is not germane to the invention.

A suspension system 40 may dynamically hold the tub 14 within the cabinet 12. The suspension system 40 may dissipate a determined degree of vibratory energy generated by the rotation of the basket 22 and/or the laundry mover 24 during a treating cycle of operation. Together, the tub 14, the basket 22, and any contents of the basket 22, such as liquid and laundry items, define a suspended mass for the suspension system 40. The suspension system 40 may be any type of suspension system and is not germane to the invention.

The washing machine 10 may be fluidly connected to a liquid supply 50 through a liquid supply system including a liquid supply conduit 52 having a valve assembly 54 that may be operated to selectively deliver liquid, such as water, to the tub 14 through a liquid supply outlet 56, which is shown by example as being positioned at one side of the tub 14. The washing machine 10 may further include a recirculation and drain system having a pump assembly 58 that may pump liquid from the tub 14 back into the tub 14 through a recirculation conduit 60 for recirculation of the liquid and/or to a drain conduit 62 to drain the liquid from the machine 10. The illustrated liquid supply system and recirculation and drain system for the washing machine 10 are provided for exemplary purposes only and are not limited to those shown in the drawings and described above; the particular liquid supply system and recirculation and drain system are not germane to the invention.

The washing machine 10 may also be provided with a dispensing system for dispensing treating chemistry to the basket 22, either directly or mixed with water from the liquid supply system, for use in treating the laundry according to a cycle of operation. The dispensing system may include a dispenser 64 which may be a single use dispenser, a bulk dispenser, or a combination of a single use and bulk dispenser. Water may be supplied to the dispenser 64 from the liquid supply conduit 52 by directing the valve assembly 54 to direct the flow of water to the dispenser 64 through a dispensing supply conduit 66. The dispenser 64 may include a dispensing nozzle 68 configured to dispense the treating chemistry in a desired pattern and under a desired amount of pressure. For example, the dispensing nozzle 68 may be configured to dispense a flow or stream of treating chemistry by gravity, i.e., a non-pressurized stream.

Non-limiting examples of treating chemistries that may be dispensed by the dispensing system during a cycle of operation include one or more of the following: water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

The washing machine 10 may also be provided with a heating system (not shown) to heat liquid provided to the treating chamber 30. In one example, the heating system can include a heating element provided in the sump to heat liquid that collects in the sump. Alternatively, the heating system may be in the form of an in-line heater that heats the liquid as it flows through the liquid supply, dispensing, and/or recirculation systems. Another example of a heating system may be a stream generator, such as a flow through steam generator or a tank-type steam generator. Moreover, the heating system may include a combination of these exemplary heaters or other types of heaters.

The liquid supply, dispensing, and recirculation and drain systems may differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry. For example, the liquid supply system and/or the dispensing system may be configured to supply liquid into the interior of the tub 14 not occupied by the basket 22 such that liquid may be supplied directly to the tub 14 without having to travel through the basket 22.

The washing machine 10 may further include a control system for controlling the operation of the washing machine 10 to implement one or more treating cycles of operation. The control system may include a controller 70 located within a console 72 or elsewhere, such as within the cabinet 12, and a user interface 74 that is operably coupled with the controller 70. The user interface 74 may include one or more knobs, dials, switches, displays, touch screens and the like for communicating with the user, such as to receive input and provide output. The user may enter different types of information including, without limitation, cycle selection and cycle parameters, such as cycle options.

The controller 70 may include the machine controller and any additional controllers provided for controlling any of the components of the washing machine 10. For example, the controller 70 may include the machine controller and a motor controller. Many known types of controllers may be used for the controller 70. The specific type of controller is not germane to the invention. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), may be used to control the various components.

Figure 2:
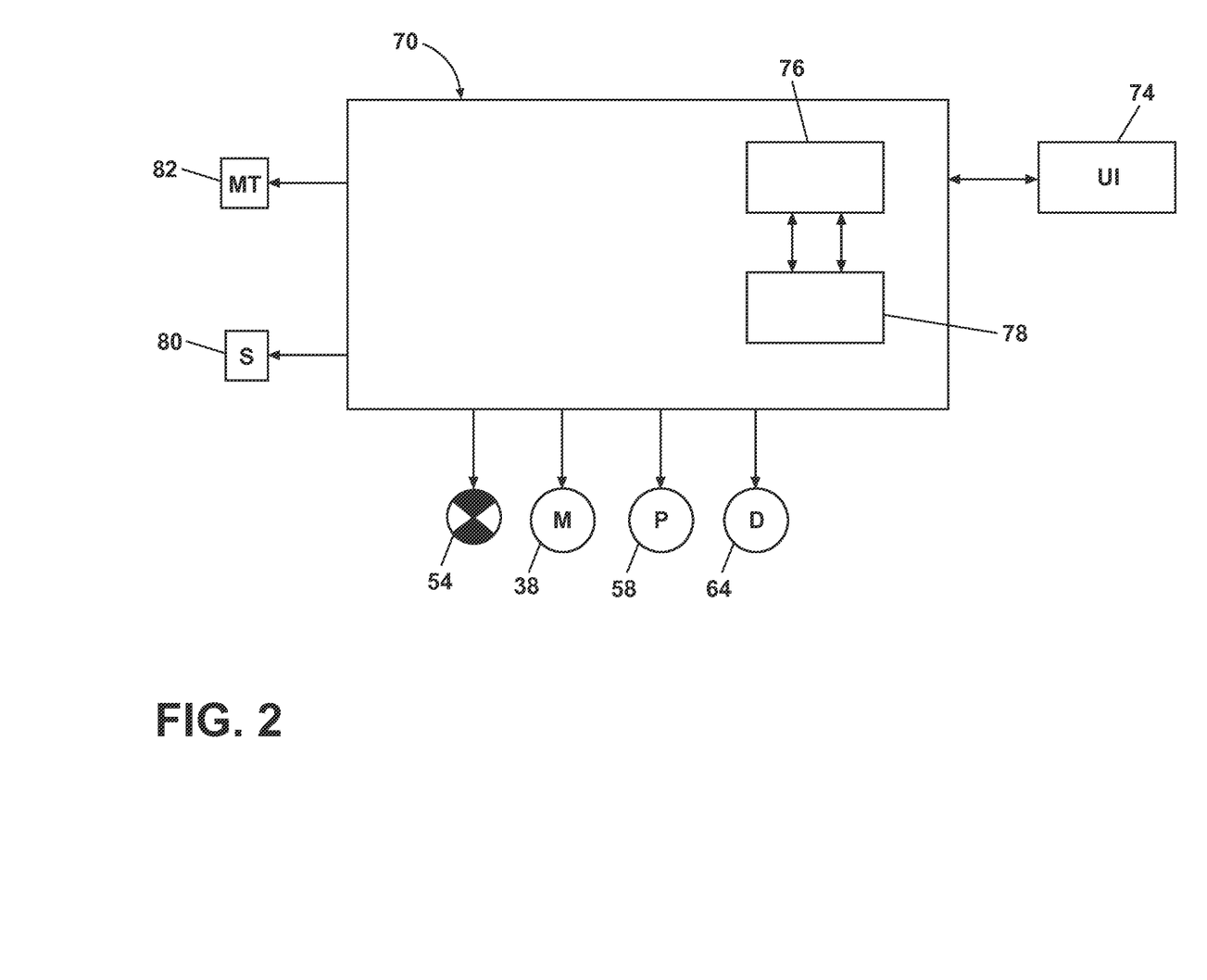
FIG. 2 is a schematic view of a control system for the laundry treating appliance of FIG. 1.

As illustrated in FIG. 2, the controller 70 may be provided with a memory 76 and a central processing unit (CPU) 78. The memory 76 may be used for storing the control software that is executed by the CPU 78 in completing a treating cycle of operation using the washing machine 10 and any additional software. Examples, without limitation, of treating cycles of operation include: wash, heavy duty wash, delicate wash, quick wash, pre-wash, refresh, rinse only, and timed wash. The memory 76 may also be used to store information, such as a database or table, and to store data received from one or more components of the washing machine 10 that may be communicably coupled with the controller 70. The database or table may be used to store the various operating parameters for the one or more cycles of operation, including factory default values for the operating parameters and any adjustments to them by the control system or by user input.

The controller 70 may be operably coupled with one or more components of the washing machine 10 for communicating with and controlling the operation of the component to complete a cycle of operation. For example, the controller 70 may be operably coupled with the motor 38, the valve assembly 54, the pump assembly 58, the dispenser 64, and any other additional components that may be present, such as a steam generator and/or a sump heater (not shown), to control the operation of these and other components to implement one or more of the cycles of operation. The controller 70 may also be coupled with one or more sensors 80 provided in one or more of the systems of the washing machine 10 to receive input from the sensors, an example of which includes a motor torque sensor 82.

The motor torque sensor 82 may include a motor controller or similar data output on the motor 38 that provides data communication with the motor 38 and outputs motor characteristic information such as oscillations, generally in the form of an analog or digital signal, to the controller 70 that is indicative of the applied torque. The controller 70 may use the motor characteristic information to determine the torque applied by the motor 38 using a computer program that may be stored in the controller memory 76. Specifically, the motor torque sensor 82 may be any suitable sensor, such as a voltage and/or current sensor, for outputting a current and/or voltage signal indicative of the current and/or voltage supplied to the motor 38 to determine the torque applied by the motor 38. Additionally, the motor torque sensor 82 may be a physical sensor or may be integrated with the motor 38 and combined with the capability of the controller 70, may function as a sensor. For example, motor characteristics, such as speed, current, voltage, direction, torque, etc., may be processed such that the data provides information in the same manner as a separate physical sensor. In contemporary motors, the motor 38 often has their own controller that outputs data for such information.

The previously described washing machine 10 may be used to implement one or more embodiments of the invention. The embodiments of the method of the invention may be used to control the operation of the washing machine 10 to determine an inertia of the laundry load held within the basket 22. The following description and corresponding illustrations related to the method are not meant to limit the method in any way as it is understood that the method may proceed in a different logical order or include additional or intervening steps without detracting from the invention.

Figure 3:
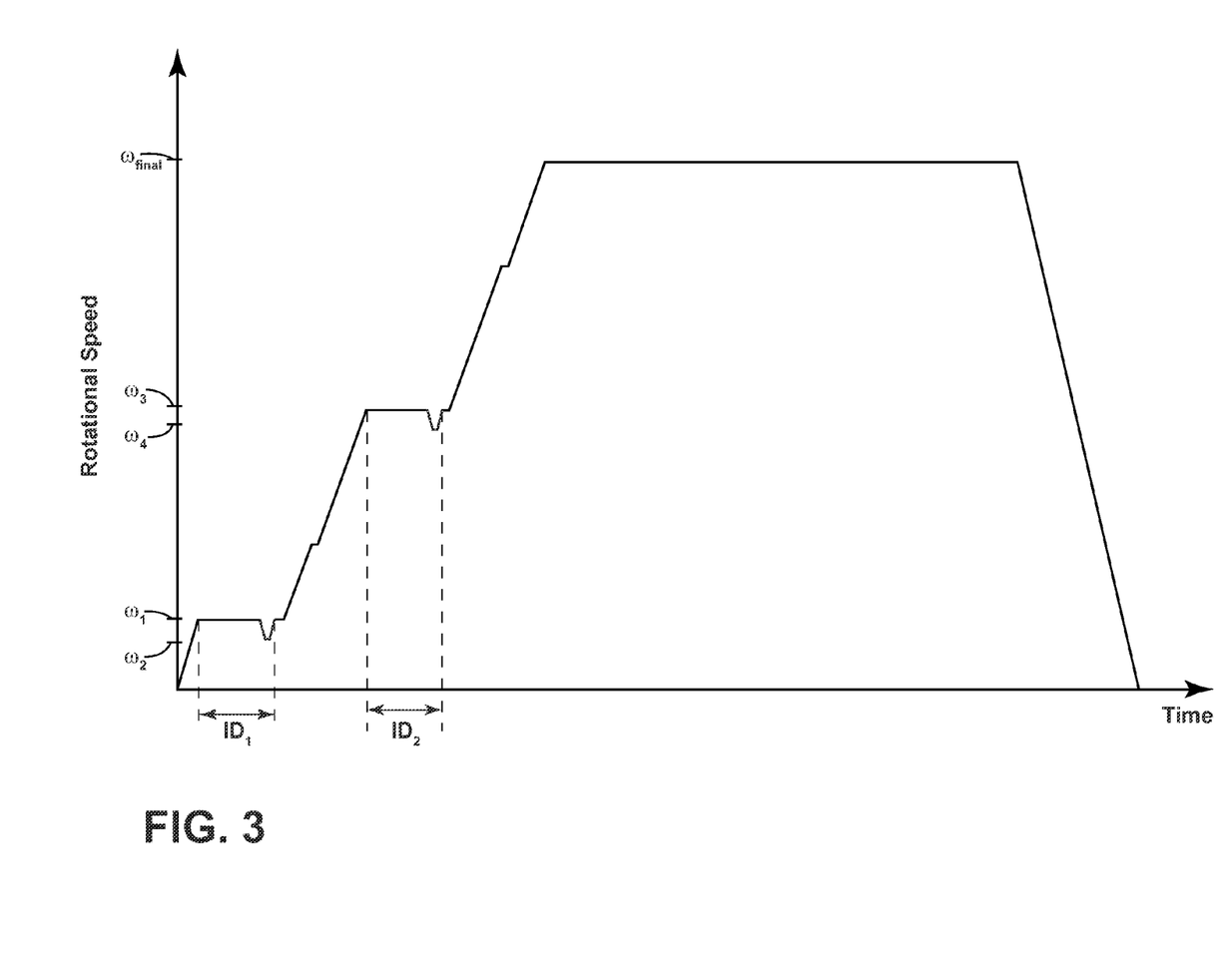
FIG. 3 is schematic graph of a spin extraction step according to one embodiment implemented by the washing machine of FIG. 1.

FIG. 3 presents a schematic graph of an exemplary spin extraction phase or step of a treating cycle of operation, which may be any type of treating cycle employing a spin extraction step, including, but not limited to the examples of treating cycles provided above. In most contemporary treating cycles for laundry, a cycle will typically comprise at least a wash phase, rinse phase, and an extraction phase. The controller 70 may be operably coupled to the motor 38, as mentioned above, to provide a motor control signal to rotate the basket 22 according to a speed profile for the spin extraction step, such as for controlling at least one of the direction, rotational speed, acceleration, deceleration, torque, and power consumption of the motor 38. For the exemplary spin extraction step of FIG. 3, the motor 38 is controlled to rotate the basket 22 through rotational speed ramps and plateaus up to a final rotational speed $\omega_{final}$. Prior to the spin extraction step, the liquid supply and/or recirculation systems have been controlled to wet the laundry load in the basket 22 with liquid, and the spin extraction step removes at least some of the liquid from the laundry load by rotating the basket 22 at speeds high enough to impart a sufficient centrifugal force on the laundry load to remove at least some of the liquid. As the centrifugal force is proportional to the distance the laundry is from the axis of rotation of the basket 22, the speeds needed to extract a desired amount of liquid during the spin extraction step will vary depending on the radius of the basket 22. In some washing machines, depending on the configuration of the washing machine, liquid extraction begins to occur when the centrifugal force on the laundry load is about 1 g, particularly for a horizontal axis washing machine. However, in some configurations, such as for a vertical axis washing machine, the force may be less than 1 g.

During the control of the rotational speed for the spin extraction step, the controller 70 executes an inertia determination phase ID to calculate the inertia of the laundry load within the basket 22. The inertia determination phase ID may occur any suitable number of times during the spin extraction step, and, in the illustrated example, the inertia determination phase ID occurs twice, a first instance $ID_1$ at first and second rotational speeds $\omega_1$, $\omega_2$ and a second instance $ID_2$ at third and fourth rotational speeds $\omega_3$, $\omega_4$.

Figure 4:
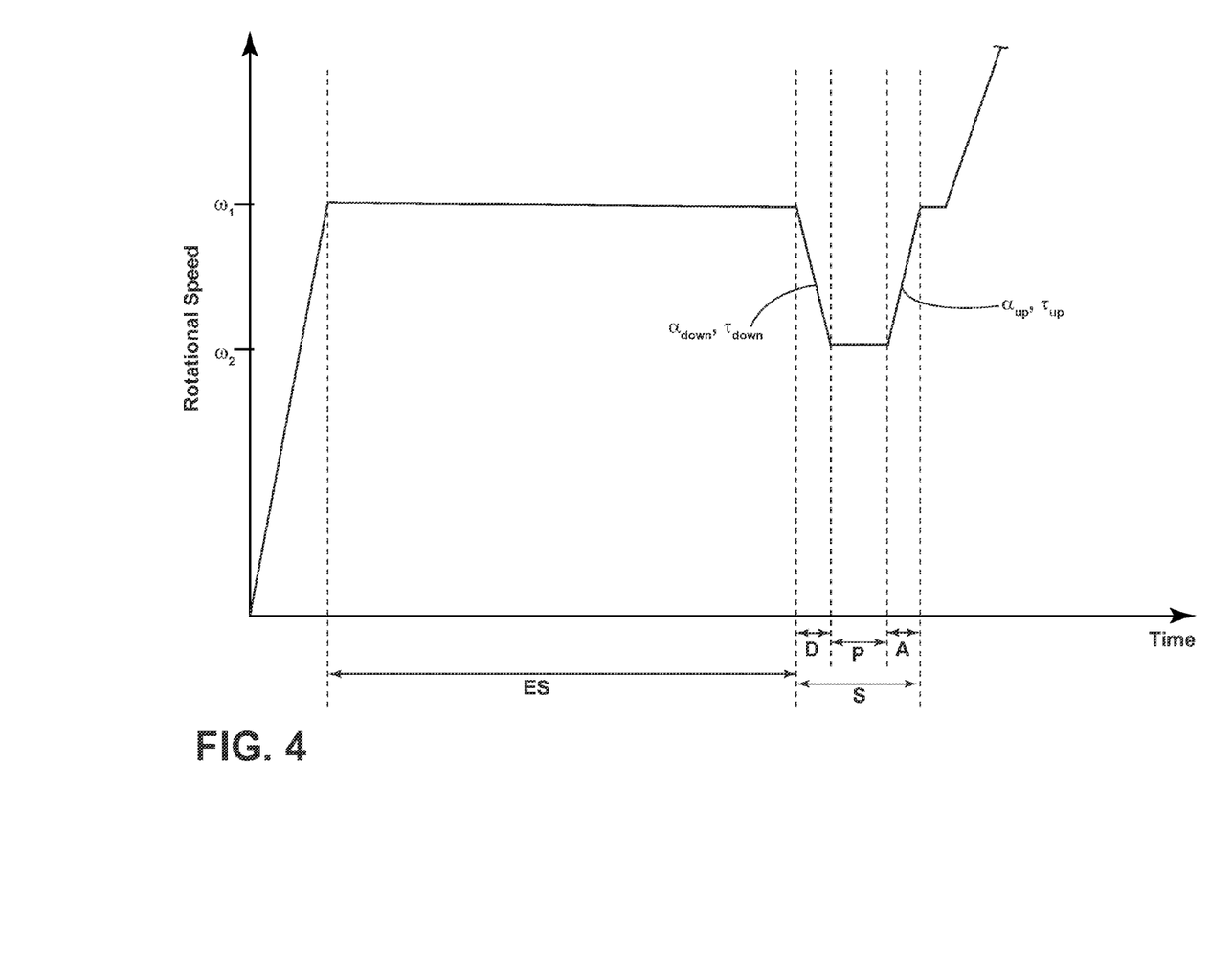
FIG. 4 is a schematic graph of an inertia determination phase according to one embodiment that is part of the spin extraction step shown in FIG. 3.

FIG. 4 presents an enlarged view of the inertia determination phase ID, which includes an extraction stabilization phase ES and a subsequent sensing phase S. During the extraction stabilization phase ES, the motor 38 rotates the basket 22 at a substantially constant speed. While illustrated as a perfect constant speed, the actual speed will vary slightly around the target constant speed because no practical controller is perfect, thus resulting in some speed variability. The first rotational speed $\omega_1$ for the extraction stabilization phase ES of the first inertia determination phase $ID_1$ may be, for example, a speed that is high enough to just begin to extract some of the liquid from the laundry load. The actual rotation speed at which this occurs will vary depending on, for example, the size and configuration of the washing machine 10. While the rotational speed is held at the first rotational speed $\omega_1$, the system stabilizes in preparation for the sensing phase S. To stabilize the system, the motor 38 rotates the basket 22 at the first rotational speed $\omega_1$ for a time sufficient to extract all or nearly all liquid from the laundry that can be practically extracted at the $\omega_1$. Liquid held by the laundry affects the inertia; therefore, as the liquid is extracted during the stabilization, the inertia reduces. At some point, there will no longer be any further appreciable extraction of liquid such that the inertia will stabilize and become relatively constant. The extraction stabilization phase ES may have any suitable duration, and, in one embodiment, the extraction stabilization phase ES has a duration sufficient to extract substantially all of the liquid that can be extracted at the first rotational speed $\omega_1$. It is feasible that the extraction stabilization phase ES lasts longer or shorter than the time required to extract substantially all of the liquid than can be extracted at that speed, with the understanding that the inertia determination may not be as accurate if the time is shorter than a time needed to stabilize the extraction and, thereby, the inertia.

With the system stabilized, the sensing phase S begins with a deceleration phase D wherein the motor 38 is controlled to decrease the rotational speed from the first rotational speed $\omega_1$ to the second rotational speed $\omega_2$. The motor 38 is controlled to reduce the rotational speed at a first commanded rate, which can be any suitable deceleration rate. The second rotational speed $\omega_2$ may be any suitable speed and may be tuned to provide the best signal to noise ratio for data sensing, which depends on the particular configuration of the washing machine 10. Once the rotational speed reaches the second rotational speed $\omega_2$, the motor 38 is controlled to hold the basket 22 on a constant speed plateau at the second rotational speed $\omega_2$, which allows the system to stabilize again. Again, the actual speed will vary slightly around the target constant speed because no practical controller is perfect, thus resulting in some speed variability. After the system is sufficiently stabilized, which may take any suitable duration, the motor 38 is controlled to increase the rotational speed of the basket 22 from the second rotational speed $\omega_2$ back to the first rotational speed $\omega_1$ during an acceleration phase A. The motor 38 is controlled to increase the rotational speed at a second commanded rate, which can be any suitable acceleration rate. The first and second commanded rates may be equal, as illustrated in FIG. 4, or may be differing rates. The overall profile of the sensing phase S has the general appearance of the letter "V" and may be referred to as a V-profile.

During the sensing phase S, the motor torque sensor 82 may sense the motor characteristic information to determine physical properties of the motor 38, which are, in turn, indicative of the rotating basket 22. For example, the motor torque sensor 82, or other suitable sensor, may sense data for the controller 70 to acquire motor torque data and basket acceleration rate data during the deceleration phase P and the acceleration phase A for use in determining the inertia of the laundry load. While the motor 38 decelerates and accelerates the basket 22 according to the first and second commanded rates, respectively, the actual deceleration and acceleration rates realized by the basket will likely differ from the commanded rates.

The controller 70 may use the sensed data to determine, by estimation or calculation, the inertia or a value indicative of the inertia. The calculation may occur immediately after the completion of the acceleration phase A of the sensing phase S, just before completion of the acceleration phase A, or at any other suitable time. Moreover, the calculation may be considered part of the sensing phase S even if the calculation occurs at a time outside the acceleration phase A. An exemplary method of calculating the inertia from the motor torque and basket acceleration rate data follows.

Generally, the motor torque for rotating the basket 22 with the laundry load may be represented in the following way:

$$\tau = J*\alpha + B*\omega + C \quad (1)$$

where $\tau$=torque, J=inertia, $\alpha$=acceleration, $\omega$=rotational speed, B=viscous damping (friction) coefficient, and C=coulomb friction. It follows that the torque during the deceleration phase D and the acceleration phase A are, respectively:

$$\tau_{down} = J*\alpha_{down} + B*\omega_{down} + C \quad (2)$$

$$\tau_{up} = J*\alpha_{up} + B*107_{up} + C \quad (3)$$

The friction terms can be canceled by subtracting Equation 3 from Equation 2 as follows:

$$\tau_{up} - \tau_{down} = (J*\alpha_{up} + B*\omega_{up} + C) - (J*\alpha_{down} + B*\omega_{down} + C) \quad (4)$$

$$\tau_{up} - \tau_{down} = J(\alpha_{up} - \alpha_{down}) \quad (5)$$

Solving for inertia, J, gives:

$$J = (\tau_{up} - \tau_{down})/(\alpha_{up} - \alpha_{down}) \quad (6)$$

The controller 70 can employ Equation 6 to determine the inertia of the basket 22 and the laundry load held by the basket 22. If need be, the inertia of the basket 22 when empty may be determined in advance and stored in the memory 76 such that the inertia of the basket 22 may be subtracted from the calculated inertia to determine the inertia of the laundry load alone. Depending on the type of motor controller, it is possible to receive an actual torque and acceleration rate value for use in the calculation. For some motor controllers, this information is not available. When the information is not available, other values indicative of the torque or acceleration may be used. For example, the torque may be proportional to a motor characteristic, such as the current of the motor, for example, which may be used instead and as part of an estimation of the inertia.

Following the inertia determination phase ID, the spin extraction cycle may continue by controlling the motor 38 to increase the rotational speed of the basket 22 above the first rotational speed $\omega_1$ toward the final rotational speed $\omega_{final}$. The transition out of the inertia determination phase ID to the rest of the spin extraction step may include an optional, short plateau, as illustrated by example, or may continue directly from the acceleration phase A without any intervening plateaus.

As mentioned above and as shown in FIG. 3, the inertia determination phase ID may be repeated as desired during the spin extraction step. The exemplary spin extraction step in FIG. 3 repeats at the second inertia determination phase $ID_2$ at the third and fourth rotational speeds $\omega_3$, $\omega_4$. The second inertia determination phase $ID_2$ may be substantially identical to the first inertia determination phase $ID_1$, with the exception of the speeds and, possibly, the commanded deceleration and acceleration rates. Any suitable speeds may be used and may be selected to give the best signal to noise ratio. The inertia may be determined in the same manner as described above using the motor torque data and the basket acceleration rate data.

Following the second inertia determination phase $ID_2$, the spin extraction step may proceed by controlling the motor 38 to increase the rotational speed of the basket 22 to the final rotational speed $\omega_{final}$, which may be any suitable final rotational speed. The actual final rotational speed $\omega_{final}$ may depend on several factors, including, for example, the configuration of the washing machine 10, the size of the basket 22, the inertia of the laundry load, and the presence and/or size of an unbalance mass in the laundry load.

The inertia determination phase ID with the V-profile has been found to have accuracy, time, and consistency improvements compared to known methods of determining inertia. One known method of determining inertia involves an A-profile wherein the rotational speed is increased, held constant, and decreased, thus having the general configuration of the letter "A." This method works well for a dry laundry load but poses accuracy issues when used with a wet laundry load due to water extraction that occurs during the A-profile. For the V-profile, because the rotational speed during sensing does not exceed the first rotational speed $\omega_1$, and because all of the water than can be extracted at speeds up to the first rotational speed $\omega_1$ has been extracted during the extraction stabilization phase ES, very little water is extracted during the sensing phase S. Conversely, for the A-profile, because the rotational speed increases during a sensing to speeds not previously reached by the basket 22, and because the amount of water extracted increases with rotational speed, a significant amount of water would be extracted during the sensing phase S. It follows that, for the V-profile, the variation in mass is relatively small, to a point of insignificance, in comparison to the large variation that would occur during the A-profile. The inertia calculations of wet laundry for the A-profile are adversely affected by the extraction of liquid, which results in high standard deviations. Because of the negligible amount of liquid extracted during the V-profile, the V-profile method produces a more accurate, reliable inertia determination for wet laundry compared to the A-profile.

Figure 5:
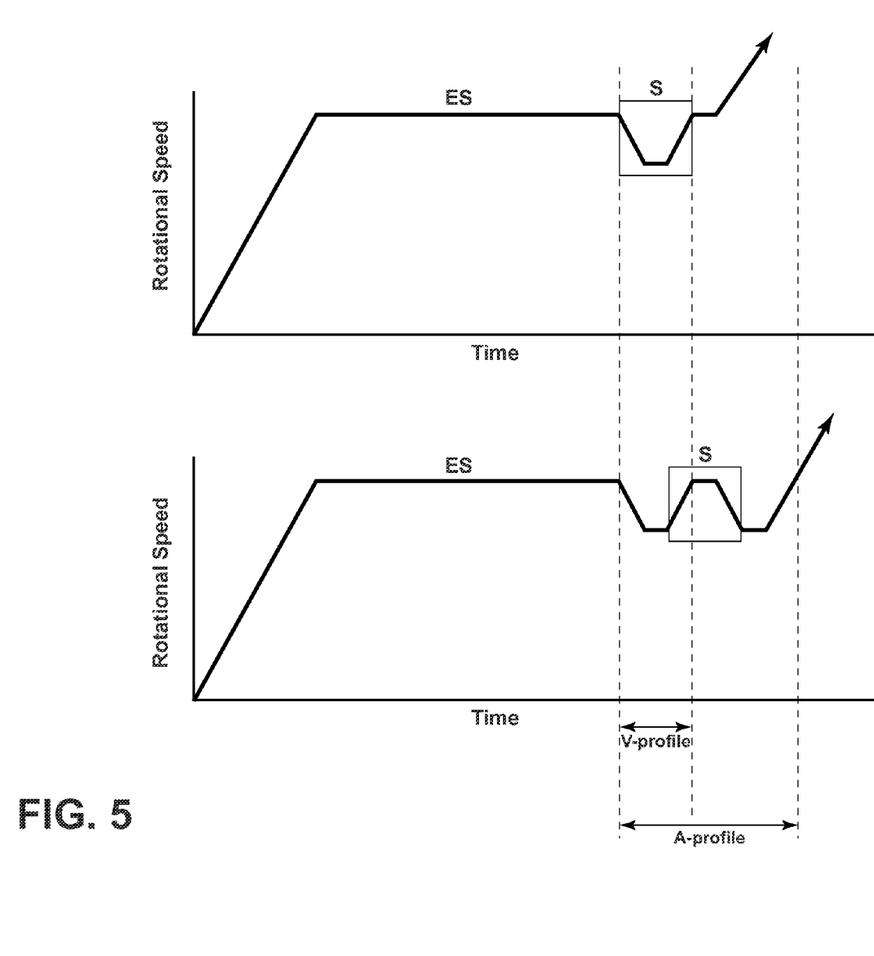
FIG. 5 presents graphs illustrating durations of the inertia determination phase for the V-profile (upper) and A-profile (lower) methods.

In addition, the V-profile has a time advantage over the A-profile, if the A-profile were to be used for the determination of the inertia of wet laundry. This time differential between the two methods is shown in the graphs of FIG. 5. The upper graph in FIG. 5 illustrates the extraction stabilization phase ES and the subsequent sensing phase S for the V-profile, which is identified in a box labeled S. In the lower graph, before the sensing phase S for the A-profile (also identified in a box labeled S) can begin, the rotational speed must decrease from the speed of the extraction stabilization phase ES so that the rotational speed can be brought back up to the speed of the extraction stabilization phase ES during the A-profile sensing phase S. The maximum rotational speed reached during the A-profile sensing phase S should not exceed the speed of the extraction stabilization phase ES, otherwise, because the speed would be higher than the maximum speed previously reached by the basket 22, water would undesirably be extracted during sensing, which would detrimentally affect the inertia calculation as described above. This necessary rotational speed decrease that occurs before the sensing phase S for the A-profile increases the overall duration of the inertia determination phase compared to the V-profile. Moreover, another time advantage occurs after the sensing phase S when using the V-profile compared to the A-profile. Because the last phase in the V-profile brings the rotational speed back toward the rotational speed of the extraction stabilization phase ES, the motor 38 simply continues with acceleration from that speed, with a possible intervening plateau, to proceed with the spin extraction step. In comparison, the A-profile sensing phase S ends with a deceleration to a speed below the speed of the extraction stabilization phase ES, and the motor 38 must then accelerate back to the speed of the extraction stabilization phase ES to get to the same point where the V-profile sensing phase S ends before accelerating above that speed to proceed with the spin extraction step. The vertical dashed lines in FIG. 5 identify the time between when the rotational speed starts to decrease from the speed of the extraction stabilization phase ES and when the rotational speed returns to that speed after the sensing phase S for each method; clearly, the V-profile has a significant time advantage compared to the A-profile.

Figure 6:
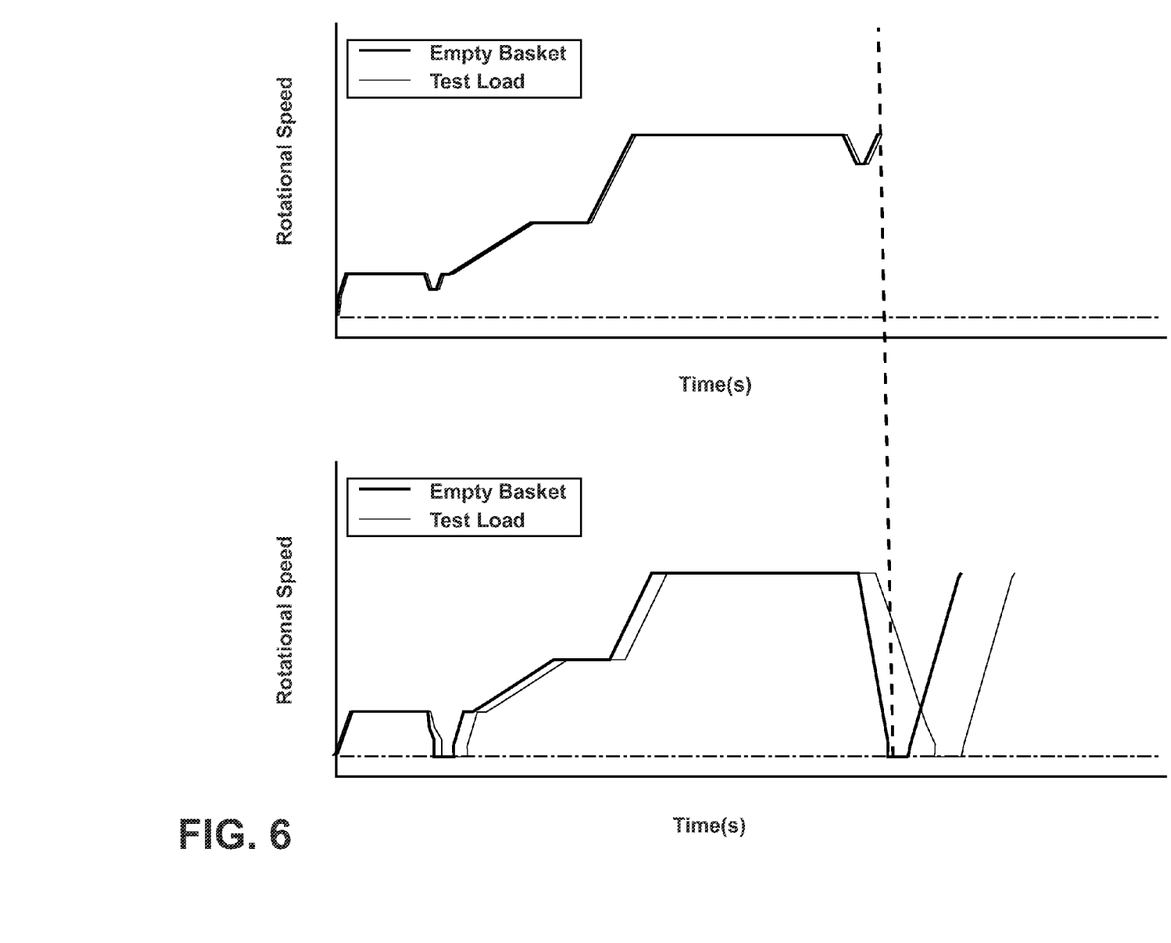
FIG. 6 presents graphs illustrating effect of load mass on sensing time for the V-profile sensing phase shown in FIG. 4 (upper) and in a prior art coast time sensing phase (lower).

Another prior method of determining inertia is the coast time method, which is known for use with wet laundry. In the coast time method, the motor 38 ceases rotation of the basket 22 from a first predetermined speed, and the time taken for the rotational speed of the basket 22 to decrease to a second predetermined speed is used to determine the inertia. The rotational speed is then brought back up to the first predetermined speed to continue with the spin extraction step. The V-profile method, however, has been determined to perform better than the coast time method from a time perspective, which aids in desirably decreasing overall operation cycle time. As shown in the upper graph of FIG. 6, which provides actual speed data, the V-profile has a consistent duration regardless of load size (data provided for an empty basket and a test load). The end of the V-profile is indicated by the vertical dashed line. In contrast, the coast time method takes longer than the V-profile to return to the extraction stabilization rotational speed, as shown in the lower graph of FIG. 6, and the time differential increases with increasing load size as the coast time method duration increases as the load size becomes larger, as seen for the test load.

Figure 7:
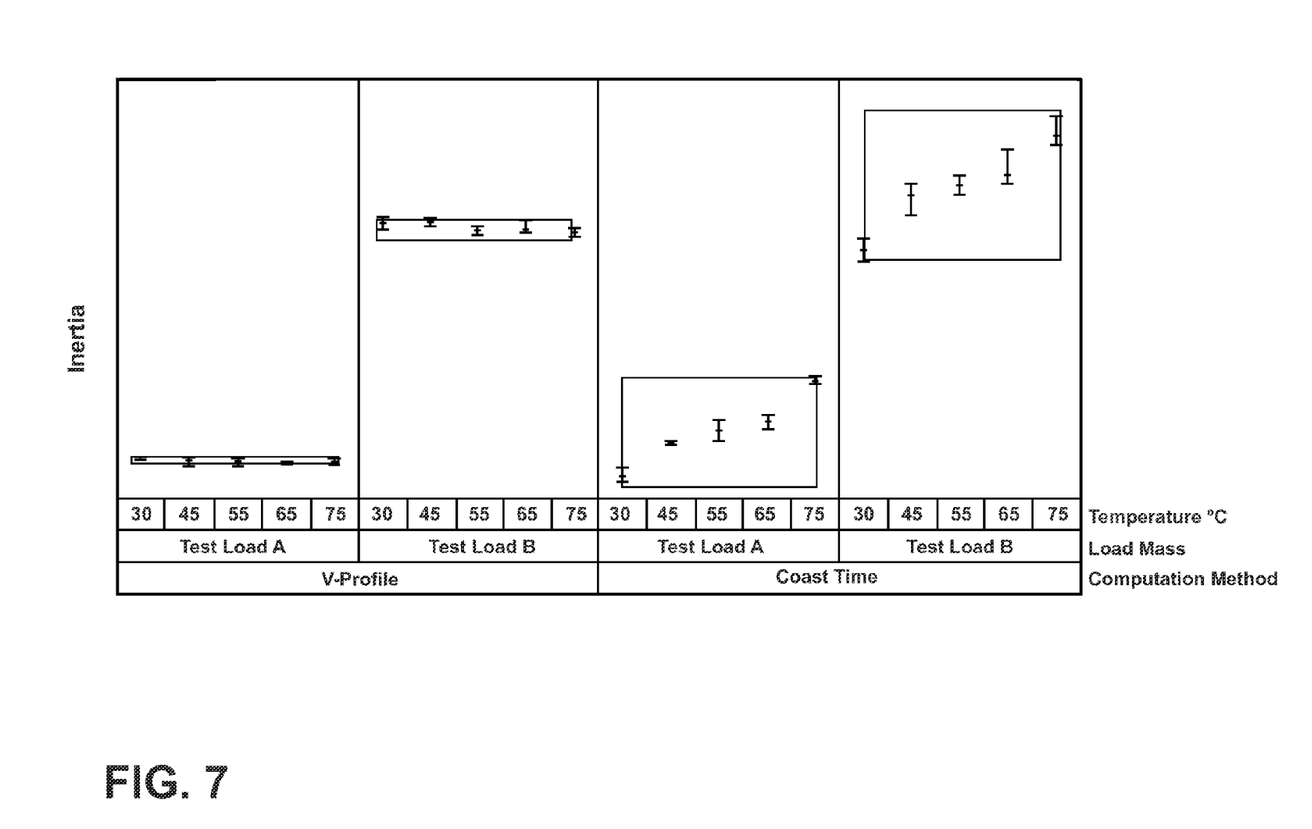
FIG. 7 presents graphs showing variation in inertia measurements for the V-profile sensing phase shown in FIG. 4 (left) and in the prior art coast time sensing phase (right), as a function of load mass and motor temperature.

In addition to a more desirable time performance, the V-profile has been shown to be more consistent than the time coast method with respect to changes in motor temperature, regardless of load size. During operation of the washing machine 10, the motor 38 generates heat as it works to rotate the basket 22 and/or the laundry mover 24, which causes an increase in the temperature of the motor 38. As seen in FIG. 7, which shows actual data for a test load A and a test load B that has twice the mass of test load A, the time coast method on the right half of the plot determines an inertia value that increases as the temperature of the motor 38 increases. The inertia calculation varies significantly for the same load mass, as indicated by the height of the box around the data points, such that the output should be compensated for the motor temperature. Conversely, for the V-profile method on the left half of the plot, the inertia calculation is significantly more consistent for a given load mass, as indicated by the shorter height of the box around the data points. Such a small amount of variation negates the need to compensate the calculation for motor temperature.

The method of determining inertia may be modified as needed, such as for different configurations of washing machines, for use in different types of operation cycles, different spin extraction steps, and other steps of operation cycles. The inertia calculations may be used as desired for the operation of the washing machine, such as, for example, for determination of final rotational speed for the spin extraction cycle, for determination of duration of the spin extraction cycle, and for determination of other variables of the operation cycle.

When performing the method of determining inertia described above, in the acceleration phase A, the basket 22 may be accelerated all the way back to the first rotational speed $\omega_1$, as shown in the figures, but it is not necessary to do so for purposes of sensing the motor torque and basket acceleration rate data to input into the inertia calculations. It is only necessary that the acceleration phase A increases the rotational speed of the basket 22 towards the first rotational speed $\omega_1$ for a time sufficient to obtain a sufficient amount of data for a good signal. Thus, the acceleration phase A may stop short of the first rotational speed $\omega_1$ (i.e., increase the rotational speed of the basket 22 to a speed less than the first rotational speed $\omega_1$) and still allow calculation of inertia. Similarly, the acceleration phase A may raise the rotational speed of the basket 22 beyond the first rotational speed $\omega_1$. Data may be acquired during the entire deceleration phase D and the entire acceleration phase A or during portions of the deceleration phase D and the entire acceleration phase A. The duration of data acquisition for determination of the inertia is not critical but need only be sufficiently long to obtain suitable data. In addition, the particular rotational speeds and commanded acceleration rates employed with the V-profile inertia determination may depend on several factors, such as, for example, the particular configuration of the washing machine and the size of the basket 22.

While the method of determining inertia has been described above and shown in the figures as being implemented in a vertical axis washing machine, it is to be understood that the method is also applicable to other types of washing machines and laundry treating appliances, including a horizontal axis washing machine. As mentioned above, in a horizontal axis washing machine, the basket is often called a drum, and these terms are used interchangeably herein such that a basket can be considered the laundry holding container in either a vertical axis or horizontal axis washing machine.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of determining an inertia of a laundry load in a laundry treating appliance comprising a tub, a basket located within the tub and defining a treating chamber for the laundry load, and a motor operably coupled to the basket for rotating the basket, the method comprising:
   an extraction stabilization phase where liquid is extracted from the laundry load by rotating the basket at a first rotational speed; and
   a sensing phase comprising a deceleration phase, where the rotational speed of the basket is decelerated from the first rotational speed to a second rotational speed, followed by an acceleration phase, where the rotational speed of the basket is accelerated from the second rotational speed at least back to the first rotational speed and then accelerated towards a final rotational speed greater than the first rotational speed, wherein motor torque data and basket acceleration rate data are sensed during the acceleration and deceleration phases;
   wherein the inertia of the laundry load is determined from the motor torque data and the basket acceleration rate data.

2. The method according to claim 1 wherein the rotating of the basket at the first rotational speed continues until substantially all of the liquid that can be extracted from the laundry load at the first rotational speed is extracted.

3. The method according to claim 1 wherein the laundry load has a constant inertia by the end of the extraction stabilization phase.

4. The method according to claim 1 wherein the first rotational speed is great enough to impart at least a 1 g centrifugal force to laundry at an inner surface of the basket.

5. The method according to claim 1 wherein the motor torque data and the basket acceleration rate data are determined from characteristics of the motor that rotates the basket.

6. The method according to claim 1 wherein the sensing phase further comprises a speed plateau after the deceleration phase where the basket is held at the second rotational speed before the acceleration phase.

7. The method according to claim 1 wherein the determination of the inertia comprises calculating a difference between motor torque during acceleration ($\tau_{up}$) and motor torque during deceleration ($\tau_{down}$), a difference between basket acceleration rate during acceleration ($\alpha_{up}$) and basket acceleration rate during deceleration ($\alpha_{down}$), and a ratio of the motor torque difference to the basket acceleration rate difference $[(\tau_{up} - \tau_{down})/(\alpha_{up} - \alpha_{down})]$.

8. The method according to claim 1 wherein the basket decelerates during the deceleration phase according to a first commanded rate, the basket accelerates during the acceleration phase according to a second commanded rate, and the first and second commanded rates are equal.

9. A laundry treating appliance for treating a laundry load according to a cycle of operation, the appliance comprising:
   a tub defining a tub interior;
   a rotatable basket located within the tub interior and at least partially defining a treating chamber receiving laundry for treatment;
   a motor operably coupled to the basket to rotate the basket;
   a liquid supply system supplying liquid to the treating chamber; and
   a controller having control software programmed to:
      control the liquid supply system to supply liquid to the treating chamber to wet laundry held in the treating chamber;
      control the motor to rotate the basket to execute:
         an extraction stabilization phase where liquid is extracted from the laundry load by rotating the basket at a first rotational speed;
         a deceleration phase, where the rotational speed of the basket is decelerated from the first rotational speed to a second rotational speed; and
         an acceleration phase, where the rotational speed of the basket is accelerated from the second rotational speed at least back to the first rotational speed; and
      sense motor torque data and basket acceleration rate data during the acceleration and deceleration phases; and
      determine an inertia of the laundry load from the motor torque data and the basket acceleration rate data; and
      control the motor to, after the accelerating of the basket from the second rotational speed back to the first rotational speed, accelerate the basket from the first rotational speed towards a final rotational speed greater than the first rotational speed.

10. The appliance according to claim 9 wherein, during the extraction stabilization phase, the controller is configured to control the motor to rotate the basket at the first rotational speed until substantially all of the liquid that can be extracted from the wet laundry at the first rotational speed is extracted.

11. The appliance according to claim 9 wherein the controller is configured to rotate the basket at the first rotational speed during the extraction stabilization phase until at least the laundry load has a constant inertia.

12. The appliance according to claim 11 wherein the first rotational speed is great enough to impart at least a 1 g centrifugal force to laundry at an inner surface of the basket.

13. The appliance according to claim 9 wherein the controller is configured to determine the motor torque data and the basket acceleration rate data from characteristics of the motor that rotates the basket.

14. The appliance according to claim 9 wherein the controller is configured to control the motor to hold the basket at the second rotational speed after the deceleration phase and before the acceleration phase.

15. The appliance according to claim 9 wherein the controller is configured to determine the inertia by calculating a difference between motor torque during acceleration ($\tau_{up}$) and motor torque during deceleration ($\tau_{down}$), a difference between basket acceleration rate during acceleration ($\alpha_{up}$) and basket acceleration rate during deceleration ($\alpha_{down}$), and a ratio of the motor torque difference to the basket acceleration rate difference [($\tau_{up}-\tau_{down}$)/($\alpha_{up}-\alpha_{down}$)].

16. The appliance according to claim 9 wherein the controller is configured to control the motor to decelerate the basket during the deceleration phase according to a first commanded rate and accelerate the basket during the acceleration phase according to a second commanded rate, and the first and second commanded rates are equal.

17. A method of determining an inertia of a laundry load in a laundry treating appliance comprising a tub, a basket located within the tub and defining a treating chamber for the laundry load, and a motor operably coupled to the basket for rotating the basket, the method comprising:
   an extraction stabilization phase where liquid is extracted from the laundry load by rotating the basket at a first rotational speed; and
   a sensing phase comprising a deceleration phase, where the rotational speed of the basket is decelerated from the first rotational speed to a second rotational speed, followed by an acceleration phase, where the rotational speed of the basket is accelerated from the second rotational speed back toward the first rotational speed, wherein motor torque data and basket acceleration rate data are sensed during the acceleration and deceleration phases, wherein the inertia of the laundry load is determined from the motor torque data and the basket acceleration rate data;
   wherein the sensing phase is repeated at third and fourth rotational speeds that replace the first and second rotational speeds and are higher than the first and second rotational speeds, and the inertia of the laundry load is determined again from the motor torque data and the basket acceleration rate data sensed during the repeat of the sensing phase.

18. A laundry treating appliance for treating a laundry load according to a cycle of operation, the appliance comprising:
   a tub defining a tub interior;
   a rotatable basket located within the tub interior and at least partially defining a treating chamber receiving laundry for treatment;
   a motor operably coupled to the basket to rotate the basket;
   a liquid supply system supplying liquid to the treating chamber; and
   a controller having control software programmed to:
      control the liquid supply system to supply liquid to the treating chamber to wet laundry held in the treating chamber;
      control the motor to rotate the basket to execute:
         an extraction stabilization phase where liquid is extracted from the laundry load by rotating the basket at a first rotational speed;
         a deceleration phase, where the rotational speed of the basket is decelerated from the first rotational speed to a second rotational speed; and
         an acceleration phase, where the rotational speed of the basket is accelerated from the second rotational speed back toward the first rotational speed;
      sense motor torque data and basket acceleration rate data during the acceleration and deceleration phases;
      determine an inertia of the laundry load from the motor torque data and the basket acceleration rate data;
      control the motor to repeat the deceleration and acceleration phases at third and fourth rotational speeds that replace the first and second rotational speeds and are higher than the first and second rotational speeds; and
      determine the inertia of the laundry load again from motor torque data and basket acceleration rate data sensed during the repeat of the deceleration and acceleration phases.

\* \* \* \* \*